(12) United States Patent
Smith

(10) Patent No.: US 7,916,278 B2
(45) Date of Patent: Mar. 29, 2011

(54) POLYSPECTRAL RANGEFINDER FOR CLOSE-IN TARGET RANGING AND IDENTIFICATION OF INCOMING THREATS

(75) Inventor: M. James Smith, Lexington, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 523 days.

(21) Appl. No.: 10/592,694

(22) PCT Filed: Apr. 1, 2005

(86) PCT No.: PCT/US2005/011195
§ 371 (c)(1),
(2), (4) Date: Jul. 16, 2008

(87) PCT Pub. No.: WO2006/028512
PCT Pub. Date: Mar. 16, 2006

(65) Prior Publication Data
US 2008/0273190 A1    Nov. 6, 2008

Related U.S. Application Data

(60) Provisional application No. 60/560,004, filed on Apr. 6, 2004.

(51) Int. Cl.
*G01C 3/08* (2006.01)
*G01B 11/14* (2006.01)

(52) U.S. Cl. .......... 356/4.01; 356/5.03; 356/622
(58) Field of Classification Search ............ 356/3.1, 356/4.01, 5.01, 5.03, 28, 29, 141.2, 614, 356/622, 623
See application file for complete search history.

(56) References Cited

U.S. PATENT DOCUMENTS

| | | | | |
|---|---|---|---|---|
| 3,180,205 A | * | 4/1965 | Pickholtz et al. | 356/3.11 |
| 4,409,900 A | * | 10/1983 | Currie | 102/213 |
| 4,896,606 A | * | 1/1990 | De Coi | 102/213 |
| 5,601,024 A | * | 2/1997 | Sepp et al. | 102/213 |
| 2002/0149510 A1 | * | 10/2002 | Salzeder | 342/13 |

* cited by examiner

*Primary Examiner* — Isam Alsomiri
(74) *Attorney, Agent, or Firm* — Daniel J. Long; Robert K. Tendler

(57) ABSTRACT

A computationless system is provided for determining the direction of and distance to a target, involving bathing an area surrounding an area to be protected with a polyspectral series of narrow fan beams of different colors from at least two spaced-apart projectors. The differently colored beams go out at different angles, thus to color-code map the area surrounding the protected space where beams of different colors cross to form color-coded cells. Light reflected back to the area to be protected from a threat has a color code corresponding to the colors associated with beams that cross at the threat, thus to identify by the reflected colors where in space the threat is located.

20 Claims, 5 Drawing Sheets

POLYSPECTRAL RANGEFINDER FOR CLOSE-IN TARGET RANGING AND IDENTIFICATION OF INCOMING THREATS

RELATED APPLICATIONS

This application claims rights under 35 USC §119(e) from U.S. Application Ser. No. 60/560,004 filed Apr. 6, 2004, the contents of which are incorporated herein by reference.

FIELD OF THE INVENTION

This invention relates to the detection and localization of incoming missiles or other ordinances and more particularly to a system for rapid identification of and ranging to close-in targets.

BACKGROUND OF THE INVENTION

In combat situations, or in situations in which troops and vehicles are deployed for policing purposes, combat vehicles and personnel are subject to attack at very close range through the use of rocket-propelled grenades (RPGs) or other ordinances which are launched from sites which are very close to the personnel or vehicles. Thus, troops and vehicles are subject to weapons launched in their immediate vicinity. There is therefore a need to be able to detect an incoming missile and to countermeasure it all within the space of, for instance, less than a second.

This presents challenges not only to the countermeasure system in which one might, for instance, have to aim and fire a so-called shotgun in the direction of the incoming missile with a sufficiently dense pellet pattern but also to be able to detect and track where the incoming missile is in the first place.

For instance, personnel and vehicles are oftentimes attacked from very close range in tens of feet, where enemy personnel launch a missile, for instance, from the side of a road or from a nearby building.

While one could attempt to detect the launching of such a missile using radar, the use of radar to provide situational awareness in the immediate proximity of a vehicle suffers from a number of problems.

Since the reaction time is a fraction of a second to a second, not only would the response time need to include being aware of some kind of munition, one would also have to include the amount of time necessary to countermeasure the threat.

In order to countermeasure such close-in threats, one would have to localize the projectile to its own size. Thus, if the missile is, for instance, a foot long and six inches in diameter, one would have to know where the missile was to the same accuracy so that one effectuates a direct hit.

As will be appreciated, microwave radars might not have sufficient resolution to be able to pinpoint the incoming missile. Moreover, such radars generally have rotating heads that move an antenna around to cover a specific area. There is thus an associated scan time that may be much too long to permit effective countermeasuring of an incoming missile.

There is also an associated processing time when using a radar involving calculating the trajectory of the missile and what is necessary to countermeasure it. Thus, there is a calculational lag that may put the response time outside of the fraction of a second response time required.

By way of further background, optical rangefinders are well known in gunnery to determine the distance to a target. In a basic form, such devices may be constructed to give the solution of a triangle having the target at its apex and the rangefinder at the lower base.

The prior art discusses improvements on optical rangefinder designs. U.S. Pat. No. 4,062,267 to Vinches et al., for example, discloses apparatus for conducting firing adapted to the aiming of a cannon movable bearing and in elevation around a turning axis as a function of aim values given by a firing table. The apparatus comprises a telescopic sight with an optical deviator element for displacement of the line of sight, the optical deviator element being mounted on a support coupled in bearing and in elevation with the cannon and being subjected to the action of a cam whose profile is determined by the aim values from the firing table and which is coupled to a motor controlled by a rangefinder device whose transmission and reception beams are connected in bearing and in elevation to the axis of the observation scope of the telescope. The optical deviator element is articulated through the intermediary of a spherical articulation on the support connected to the cannon and the optical deviator element is subjected to the signal of a detector of the vertical operating so that the observation axis must be maintained in a substantially vertical plane passing through the direction of the target.

While such devices have tended to work well for the purpose of controlling fire directed against stationary or slow moving targets at a substantial range, these devices have limitations with respect to fast moving targets in close proximity to the sensing vehicle or structure.

U.S. Pat. No. 4,556,313 to Miller et al. discloses a rangefinder that is adapted for use as a proximity fuse. This patent discloses an optical rangefinder having a transmitter and receiver located closely adjacent for short-range operation, as when a projectile or bomb is sent on a trajectory to intercept a large object. An optical window region is established where the transmitter look axis intersects the receiver look axis and is adjustable for providing an output signal when the rangefinder and target are less than approximately ten feet apart. The transmitter may emit either noncoherent or coherent infrared energy. The receiver includes zero crossing detection when a received maximum signal intensity is reached and adequate signal detection means that activates when the signal level exceeds a desired minimum. An output signal is generated when the outputs of these two detection circuits are coincident.

This system, however, does not address the problem of detecting incoming projectiles or missiles that can be coming in from all directions. Also it does not address the issue of computation time that is exceedingly short when it is necessary to detect and localize close-in missiles or projectiles.

A need therefore exists for a close-in system that does not involve location calculations or slewing of optics. In particular, a need exists for a for a system that may be used to accurately determine the existence and range of an approaching rocket-propelled grenade, RPG, or other rapidly-moving ordnance.

While the prior devices have tended to work well for the purpose of controlling fire directed against stationary or slow moving targets at a substantial range, these devices may have limitations with respect to fast moving targets in close proximity to protected vehicles or personnel.

SUMMARY OF INVENTION

In the subject invention, rather than using conventional monochrome radar or LIDAR techniques, and rather than using other optical ranging systems, a polyspectral rangefinder is provided that projects narrow vertical fans of light of different colors outwardly from two or more positions such that each of the narrow fan beams has a color different from that of the next adjacent fan beam. The fan beams cross each other at various positions away from the position at which the beams are projected so as to map the surrounding space by bathing the surveilled area with crossing fan beams. The crossing point of two or more colors constitutes a color-coded cell. This map of color-coded cells is stored as color bins in a lookup table such that, by detecting light reflected from an incoming missile or target, one can detect its location by simply determining the colors returned at any given instant of time.

Thus an incoming missile might be illuminated by a green beam from one position and a red beam from the other position when the particular missile enters into a cell or region where these two beams cross. Where these two beams cross defines a cell in space in which returns of red and green light indicate the exact point in space that the missile is passing through.

The fan beams are arranged so that each color is projected outwardly at a different angle. This establishes a map of unique color combinations for each cell at the crossovers of the fan beams from the two sources.

For instance, if one were to use two so-called showerhead projectors in which fanned light beams are projected out at 200 different angles from each of the two showerhead projectors, then for instance at 30 meters one would have a unique 5-cm-by-5-cm cell, the returns from which would uniquely specify the location of the reflecting object.

The detection of what colors are returned instantly determines, by virtue of the lookup table without computationally intensive algorithms, where the missile is. One then can direct countermeasures along the line from the place where the returns are sensed to the cell, thus to be able to countermeasure the incoming threat before it impacts the vehicle.

Since no computations are involved in locating the missile other than accessing a lookup table, detection of an incoming missile can be obtained in only a fraction of a second, virtually instantaneously. This permits rapid repositioning and firing, for instance, of a shotgun-type countermeasuring device.

It will also be appreciated that to minimize the size of the colored cells, one could increase the number of different colored fan beams projected, so that one could pre-map the area around the vehicle with greater resolution.

It will be appreciated that as the incoming missile or projectile proceeds into the area at which crossed differently colored beams exist, light from one colored beam is reflected simultaneously with the light of the other colored beam.

If the beams were of the same color, then one could not tell along which beam the threat existed.

In one embodiment, the showerhead projectors are mounted at two sides of a vehicle that would spew out or project rainbows of light. One way of obtaining the fans or wedges of the differently colored light is to use conventional analog wavelength division multiplexing units common in communications systems. In these systems, laser-generated light from a broadband laser is divided up into a number of colors through the use of a multiplexer. The multiplexer basically takes the broadband light and taps off different colors through specially designed gratings that couple light of a predetermined color into a particular optical fiber.

The light from the end of an optical fiber is then focused to project out the required fan beam of light at a given angular orientation with respect to the optical centerline of the projection head and thus the optical centerline of the system. Each fan beam of colored light thus goes out at a predetermined angle with respect to the centerline of the vehicle.

Note that wideband lasers are available to produce a spectrum of light that can be coupled into a self-contained array of filters utilizing the aforementioned tapped optical fibers, with each filter picking off a predetermined color and then feeding it to its own little optical nozzle. Each of these nozzles is located in a slightly different direction so that, when light from each of the nozzles goes out through space around the protected area, the associated color goes in a different direction from that associated with the adjacent beam.

By detecting the colors that are returned, one uses a lookup table that maps the particular colored cells in color bins so that one can at minimum tell the direction to the incoming threat, that direction being the line from the sensor that detects the reflected light to the particular cell in question.

As to protecting vehicles, in deploying the subject system, one would architect the projectors for each vehicle. If one wanted to surround the entire vehicle in 360° with intersecting fans of differently colored light, as a practical matter one might wish to segment the surveilled area into sectors having a 60° included angle. It is also possible to re-use colors from one side of the vehicle to the other because one could use detectors, for instance, that would only pick up light coming in from one particular direction.

It will be noted that in the subject system, each color is sent out in a beamlet of a predetermined width that cuts a little narrow pie-shaped sector in space. When that sector in space is crossed by another beamlet of a different color, it defines a little cell of space or a volume in space that is uniquely identified by the colors existing at the cell. The result is that one color-codes the space.

In summary, what one is doing is to break up the space around the vehicle into cells, with each cell having its own description in terms of a limited number of colors that could only have come from that particular point in space.

As to the wavelength division multiplexing technology mentioned above, filters have been developed that either multiplex or demultiplex various colors of light. From the detection array point of view, one would channel all of the incoming light into one fiber having pickoffs provided by different gratings such that light carried by a particular fiber would be identified as having a particular color. These types of detectors are inexpensive, with the light exiting a particular fiber being detected by a particular pin diode or similar detector. One would therefore have one pin diode per channel or color. Additionally, thresholding circuits may be used to threshold out the ambient or ground clutter so that the signal received from a reflecting object entering into a particular cell is distinguished from the background.

As to the generation of the multiple colored beams, one could typically use a wavelength multiplexer to generate wavelengths $\pi 1, \lambda 2, \lambda 3 \ldots \lambda n$. In this case the broadband laser output is divided up and outputted from various of the associated fibers. The light in the fibers is then projected out through a small lens or projection system at the so-called showerhead.

As to detecting the color-coded reflections, it will be appreciated that the output of a pin diode or pixel would be one-to-one correlatable with a particular wavelength. The identification of the particular wavelength makes possible the use of the aforementioned lookup table, such that the output of any series of particular pin diodes specifies a particular color-coded cell.

As far as the transmitted beams and wavelength division multiplexing filters, one has an input fiber on which one grafts a number of branch fibers. A diffraction grating is located at each graft that determines the particular wavelength of light that can be picked off of the fiber. Thus, the fiber is an assemblage of wavelength-selective taps connected to a main fiber such that a number of different wavelengths are projected out by different fibers at slightly different angles.

As to the number of colors required for a given mapping or area, one can go from 100 to 1,000 different colors depending on how finely one can divide the light going into and out of the multiplexers.

Thus, in terms of resolution, one must decide how many volume cells one wants in a particular space, with each volume cell requiring either two, three or four colors to uniquely specify it.

Note that the number of different colors that is required for a given resolution varies with the distance out from the vehicle. It is noted that one has to have a finer angular resolution when a threat is relatively far out, for instance at 30 meters, than when an incoming threat is in close, for instance at ten meters. For this purpose one could arrange the showerhead of light projectors to be non-uniformly distributed so that, in the far field segments, the beams are more narrowly spaced and angled than those associated with the close-in positions.

In one embodiment, beam width is 1/10 of a degree or 1/600 of a radian for a five-centimeter accuracy at 30 meters.

As will be appreciated, the subject invention minimizes the computing time for curing the countermeasure weapon because all that is necessary is to read out a lookup table. Note that by identifying the unique color cell, one instantly has the direction to the incoming ordnance from the lookup table. One therefore has provided a system for detecting incoming missiles that involves minimal computing so that one can respond more quickly to an incoming threat.

While the subject system is described in terms of protecting a vehicle, the subject system also includes protecting any area that has special protection requirements. As such, the subject system can protect buildings or other structures, aircraft or even personnel.

In summary, what is provided is a computationless method for determining the direction of and distance to a target, involving bathing an area surrounding a vehicle, article or individual to be protected with a polyspectral series of narrow fan beams of different colors from at least two spaced-apart projectors. The differently colored beams go out at different angles, thus to color-code map the area surrounding the protected space where beams of different colors cross to form color-coded cells. Light reflected back to the protected space from a threat has a color code corresponding to the colors associated with beams that cross at the threat, thus to identify by the reflected colors where in space the threat is located.

This method includes the first step of directing a first beam of light comprising a first plurality of colors from a first position on a sensor platform. A second beam of light including a second plurality of colors is directed from a second position on a second sensor platform so that the second beam of light intersects the first beam of light in an intersection area. This intersection area includes a plurality of color cells formed by the intersection of the first plurality of colors and second plurality of colors. Each of these color cells has a unique two-color signature. Reflected light from the target is received, and the position of the target is ascertained based on the unique two color signature of the color cell in which the target is located. The present invention also includes a polyspectral range finder for carrying out this method.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
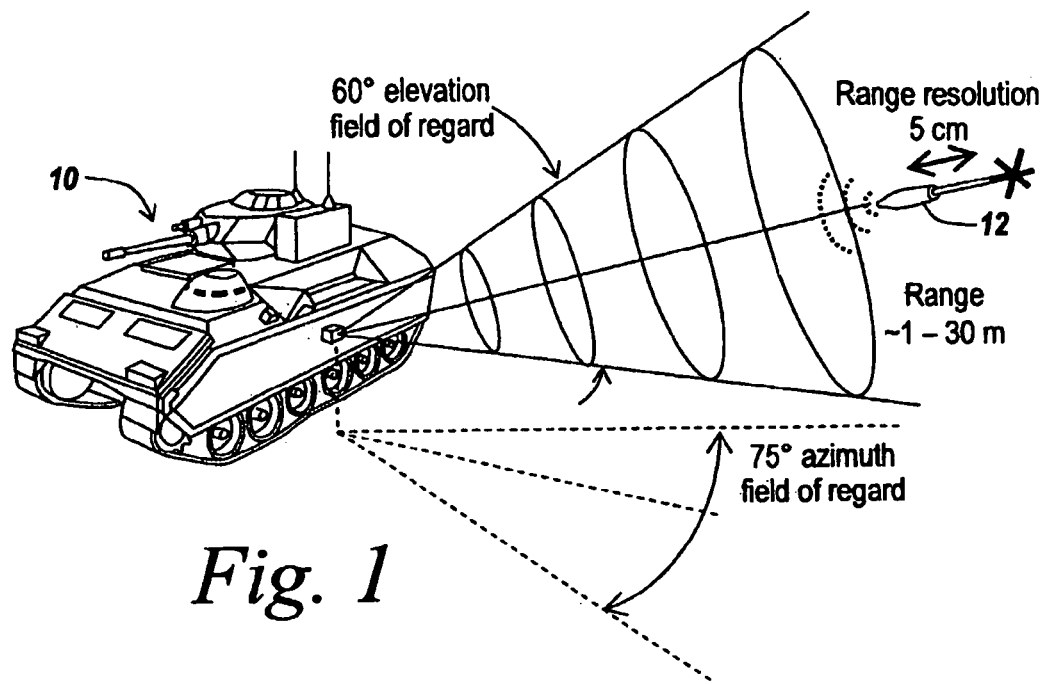
FIG. 1 is a diagrammatic illustration of an incoming threat in terms of a rocket-propelled grenade, showing a 60° elevation field of regard and a 75° azimuth field of regard to form a surveillance area for the detecting of an incoming missile to a 5 cm range resolution for ranges between 1 and 30 meters.

Referring now to FIG. 1, in order to be able to protect a vehicle 10 such as a tank from an incoming missile or ordnance 12 such as an rocket-propelled grenade or TOW missile, from a practical standpoint one needs, in one embodiment, 60° in elevation for a field of regard as well as 75° in azimuth for a field of regard. Thus, the surveilled area is divided up into 60° sections.

It is possible using standard techniques to cue a countermeasure module or system from conventional warning or tracking radar for crude or rough aiming, assuming a minimal time is spent in the rough positions of the countermeasure device. However, such conventional fire control systems may be too slow; and the subject system may be used in place of prior fire control systems. The subject system may thus be integrated into an active protection system, with the purpose to provide aim point refinement for close-in defensive rounds and to provide a target identification, i.e., an RPG, TOW missile or a ballistic round.

Figure 2:
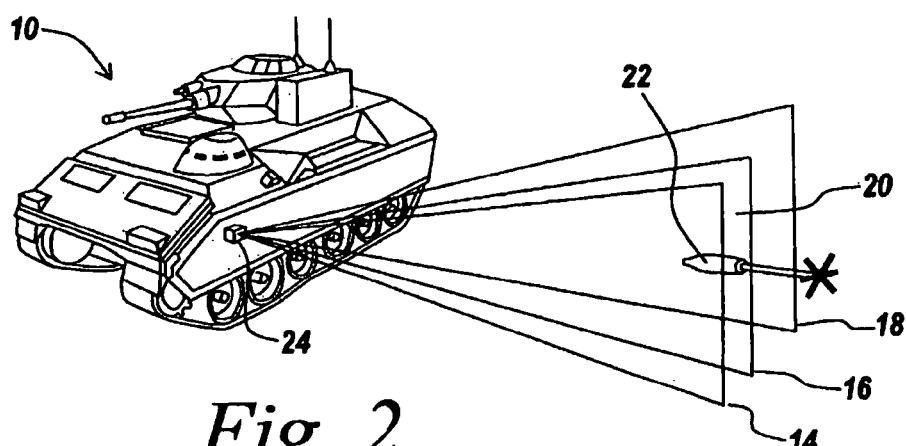
FIG. 2 is a diagrammatic illustration of a vehicle, such as a tank, provided with the subject polyspectral rangefinder in which, for one location on the vehicle, narrow fan beams of color are projected out from the side of the vehicle into the surveillance area so that an incoming missile or ordnance will reflect one of the beams impinging on it.

Referring now to FIG. 2, in one embodiment, vehicle 10 projects out differently colored fan beams 14, 16, 18 and 20 into a surveilled and protected area when they are able to impinge on a threat 22 as it approaches vehicle 10. What can be seen in this figure is that the beams projected from a point or projector 24 on vehicle 10 are narrow in lateral extent, are displaced angularly in the horizontal direction and cut a relatively thin swath or wedge upwardly.

Figure 3:
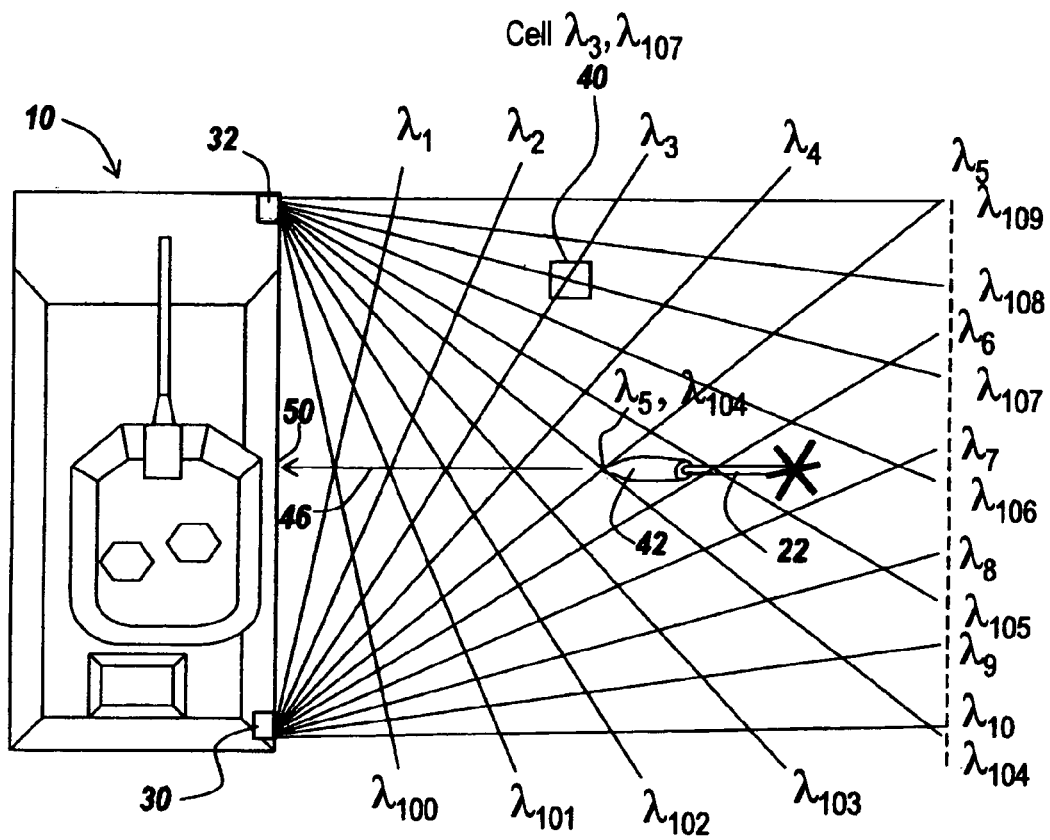
FIG. 3 is a diagrammatic illustration of the tactical situation in FIG. 2 in which multiple differently colored fan beams are projected out from two spaced-apart projectors such that the fan beams intersect each other to provide a color-coded range map of individual cells at which two or more colored beams intersect.

Referring to FIG. 3, if vehicle 10 were provided with two projectors, here shown at 30 and 32, these projectors project differently colored fan beams illustrated by $\lambda 1$, $\lambda 2$, $\lambda 3$, $\lambda 4$, $\lambda 5$, $\lambda 99$ and $\lambda 100$, $\lambda 101$, $\lambda 102$, $\lambda 103$, $\lambda 104$, $\lambda 105$, $\lambda 106$, and $\lambda 107$, respectively with each beam having a different color.

The intersection of the beams from projectors 30 and 32 effectively maps the area around vehicle 10 such that intersections of, for instance beam at $\lambda 3$ with beam at $\lambda 107$ define a cell 40 where the beam having color $\lambda 3$ intersects the beam having color $\lambda 107$.

As will be seen, the size of cell 40 is determined by the number of adjacent differently colored beams that can be generated, with the desired cell size being no longer than the projected size of the incoming threat. In one embodiment the desired resolution size corresponds to a cell size of 5 cm on a side.

It will be noted that missile 22 has a forward end 42 that reflects a portion of beam $\lambda 5$ and a portion of beam $\lambda 104$ back towards vehicle 10 as illustrated by arrow 46. This is the specular return from target 22 that directly indicates target direction, position and extent.

It will be appreciated that what is depicted is that the adjacent space to the vehicle is color coded using intersecting fans of distinct colored beams, with the range to a threat being defined by range bins that are one-to-one correlatable with color bins. The color code of returned radiation thus uniquely specifies the location of the threat reflecting the projected beams.

Figure 4:
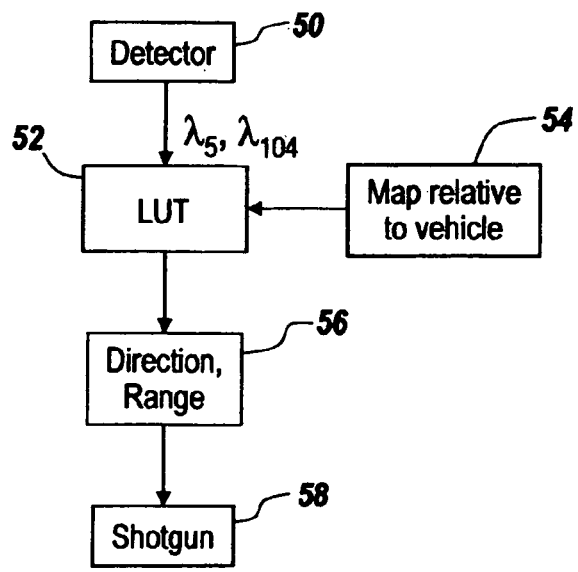
FIG. 4 is a block diagram illustrating the detection of light reflected from an object that passes through the surveillance area of FIG. 3 in which the receipt of two or more colors is mapped to a predetermined location through the use of a lookup table for determining the direction and range of the incoming object, from which a countermeasure such as a shotgun can be deployed.

In one embodiment, the two projectors are 600-beam showerhead projectors using, for instance, microlens arrays. A detector or sensor 50 detects reflected radiation from the surveilled scene and, as illustrated in FIG. 4, couples the result of having received colors $\lambda 5$ and $\lambda 104$ to a lookup table 52. The lookup table maps the detected colors with the map of the color-coded space around the vehicle. A read-out of the lookup table thus specifies location and direction of the threat. The size of the threat can be determined by what color-coded cells are detected at one time.

In order to be able to provide such a lookup table, one has to map the colored space relative to the vehicle as illustrated at 54 and to provide this map in terms of the aforementioned color bins.

Without complicated algorithms, by simply noting from the lookup table the range bin that is associated with a color bin, then as illustrated at 56 the direction and range to the threat can be quickly ascertained. Once having ascertained the direction and range, or simply the direction in the case of a shotgun type of countermeasure, shotgun 58 is swiveled in the general direction indicated and fired, with the pellet pattern being sufficient to intercept the detected incoming ordnance, missile or round. Note that knowing the location of the threat is used to decide when to fire the shotgun for optimum pellet cloud size.

It will be appreciated that the amount of time necessary to detect the presence of an incoming threat is de minimus due to the fact that calculations are not required to determine the direction and range of the threat. The remainder of the time spent in countermeasuring the threat is centered about the response of the countermeasure itself, once knowing the direction and range of the threat.

It has been shown that present shotgun-type countermeasuring devices can project a lethal pellet pattern in the direction of the incoming threat in less than half a second, once knowing where to aim the shotgun. The time necessary to aim and shoot the shotgun determines the response time of the system, since direction and range detection is virtually instantaneous upon receipt of reflections or returns from the threat.

Figure 5:
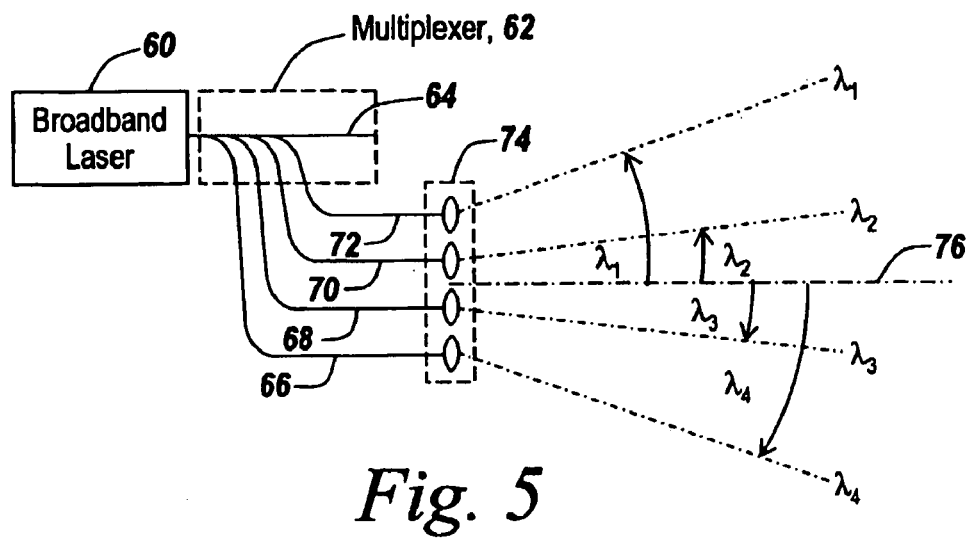
FIG. 5 is a schematic diagrammatic of the production of variously colored adjacent fan beams using a broadband laser and a multiplexer in which various optical fibers are tapped off a main fiber, with the tap including optical gratings to facilitate tapping off various colors, also indicating the projection of different colors at different angles from the optical axis of the system.

Referring now to FIG. 5, in one embodiment, in order to project the differently colored and differently angled fan beams, a broadband laser 60 is provided that may be a 600-watt solid state laser having a broadband output of between 1540 nm and 1570 nm. The output of the broadband laser is coupled to a conventional dense wavelength division multiplexer 62 available from Nippon Telephone & Telegraph of Tokyo, Japan. Multiplexer 62 includes a main fiber 64 and a number of tapped fibers 66, 68, 70 and 72 grafted to main fiber 64. At the point of the graft is a spectral grating that selects what frequency light is permitted to enter the fiber such that, with multi-microlens projection optics 74, one can project differently colored fan beams as illustrated by $\lambda 1$, $\lambda 2$, $\lambda 3$, and $\lambda 4$, at different angles to the optical axis 76 of the projector.

Figure 6:
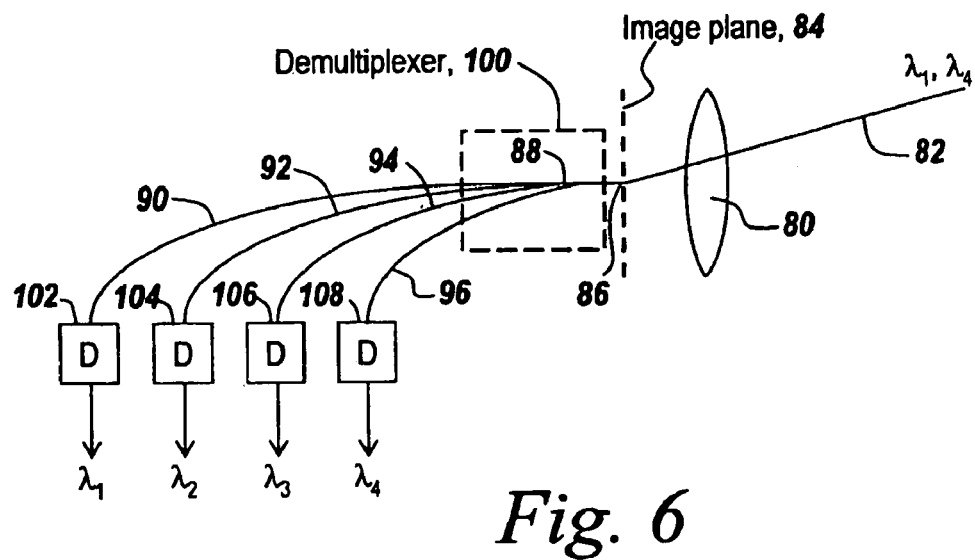
FIG. 6 is a schematic diagram illustrating the receipt and detection of returns from an object in the mapped space of FIG. 3, illustrating that incoming returns are focused onto a main fiber in a demultiplexer, and in which a multiplicity of other fibers are grafted to the main fiber at gratings such that an output of a detector at the end of one of these fibers indicates receipt of a reflection of a predetermined wavelength.

Referring to FIG. 6, in one embodiment detector 50 of FIGS. 3 and 4 includes an optical focusing system 80 that focuses returned light 82 onto focal plane 84. Focused light enters the end 86 of a main optical fiber 88, with fibers 90, 92, 94 and 96 grafted to one main fiber 88. This assemblage constitutes a demultiplexer 100 in which differently colored light is injected into different fibers due to spectral gratings at the tap points. The result is that detectors 102, 104, 106 and 108 have outputs indicating the receipt of light at $\lambda 1$, $\lambda 2$, $\lambda 3$ and $\lambda 4$. The outputs of detectors 102-108 contain signals indicating a spectral return imaged onto fiber end 86 having the indicated color-coded components. Here the return is color coded with $\lambda 1$ and $\lambda 4$ light. The result is that detector 102 and 108 each generate an output signal.

Figure 7:
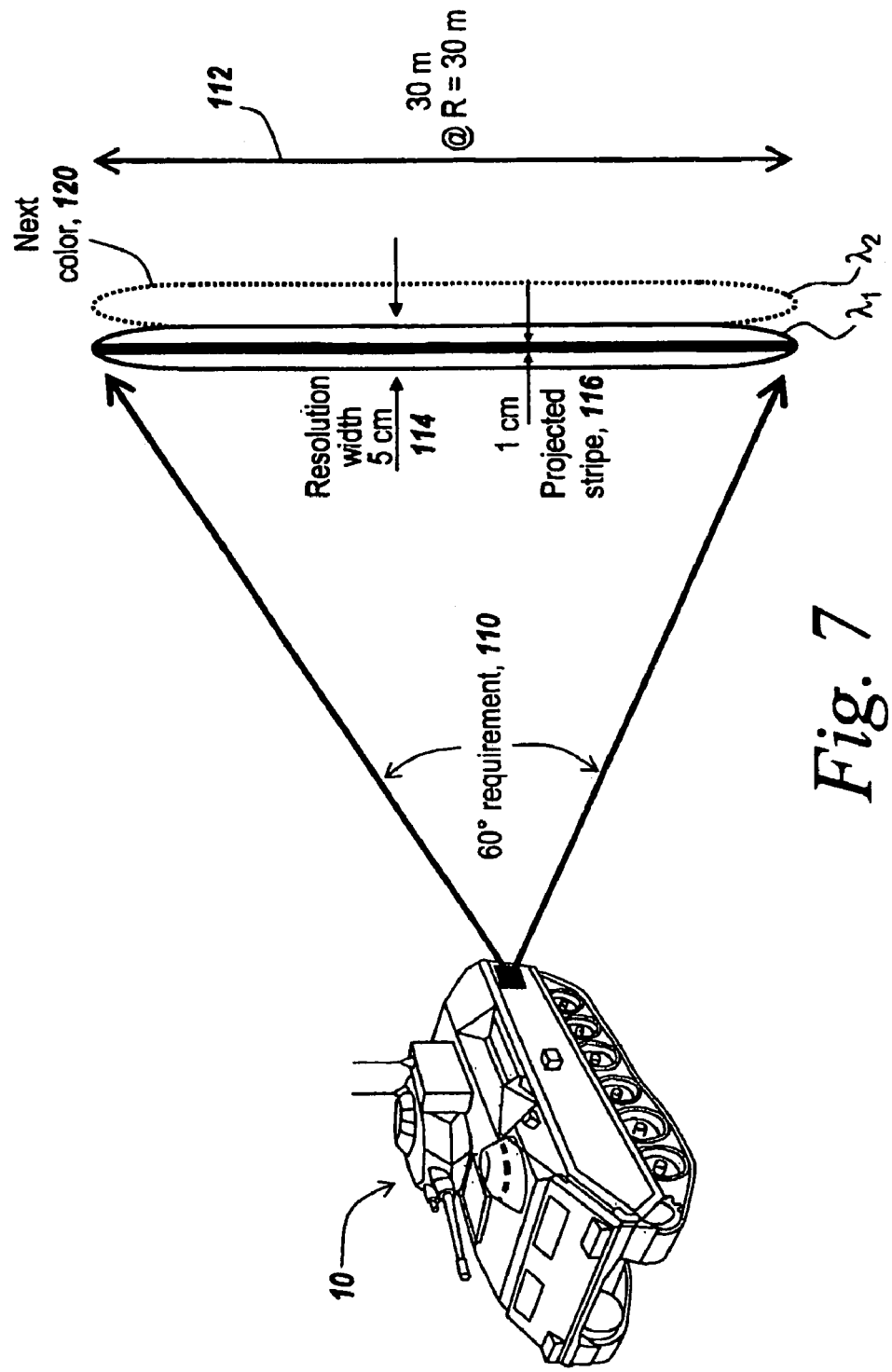
FIG. 7 is a diagrammatic illustration of the resolution of the subject system, with a projected stripe at a range of 30 meters from a projector, assuming a 30-watt, 600-channel system, with 50 milliwatts per channel, a 3,000 cm$^2$ illustration/interrogation area ($3 \times 10^{-4}$ sr), assuming a staring system with no gimbals and assuming transmit/receive optics shared or matched.

Referring now to FIG. 7, what is depicted is that from a vehicle 10 with a 60° elevation field of regard 110, at a 30-meter cross-section as illustrated at 112 and at a range of 30 meters, the cross-sectional width or thickness of a fan beam is quite small, on the order of 1 cm. For instance, for a 30-watt laser at 600 channels with 50 milliwatts per laser and a 3,000 cm$^2$ illumination/integration area ($3 \times 10^4$ sr), and assuming a staring system with no gimbals and with transmit/receive optics that are shared or matched, then for a first color there is a resolution width of 5 cm as illustrated at 114, with a projected stripe width of 1 cm as illustrated at 116.

The next color would occupy a different portion of space as illustrated by dotted line 120.

Thus, with a projected stripe having a narrow stripe width of 1 cm and a resolution width of 5 cm, one can achieve a 5 cm-by-5 cm range cell. Note, the height of the projected fan beam at 30 meters is 30 meters, whereas the thinness of the projected fan beam is a stripe that is a narrow 1 cm stripe, leading to the above-mentioned resolution width of 5 cm.

Figure 8:
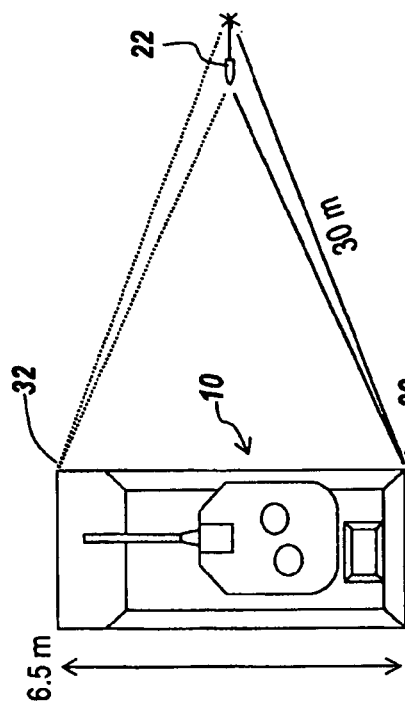
FIG. 8 is a diagrammatic illustration of uniform target length resolution that requires non-uniform angular distribution of channels in which the distance between projectors is 6.5 meters and the range to a threat is 30 meters.

Referring now to FIG. 8, assuming a uniform target length, the resolution required is as illustrated, assuming vehicle 10 has projectors 30 and 32 that are spaced apart by 6.5 meters.

Figure 9:
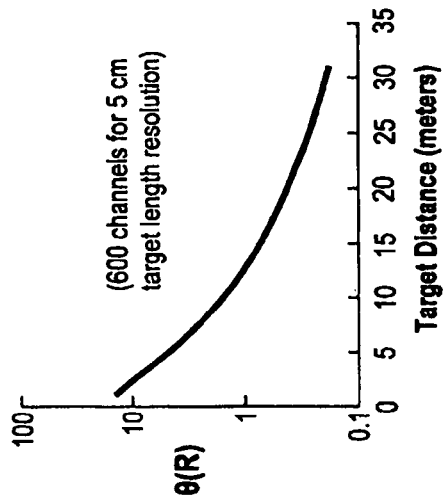
FIG. 9 is a graph of color beam separation in milliradians versus target distance, illustrating that the color probe beam separation is greater close in; and, FIG. 10 is a diagrammatic illustration of the color beam separation calculation of FIG. 9, showing that for a resolution element of length=5 cm at a range from one to 30 meters, the color probe beam separation is proportional to $1 L/2R^2$.

Assuming a threat 22 at a range of 30 meters from each of the projectors, then as illustrated in FIG. 9, which is a graph of color beam separation in milliradians versus target distance in meters, for 600 channels for a 5-cm target length resolution is a non-uniform angular distribution of channels is required. This means, for instance, that at 30 meters the color probe beam separation in the horizontal direction is about 0.4 milliradians, whereas close in at 10 meters the color probe beam separation is approximately 1.2 milliradians.

Figure 10:
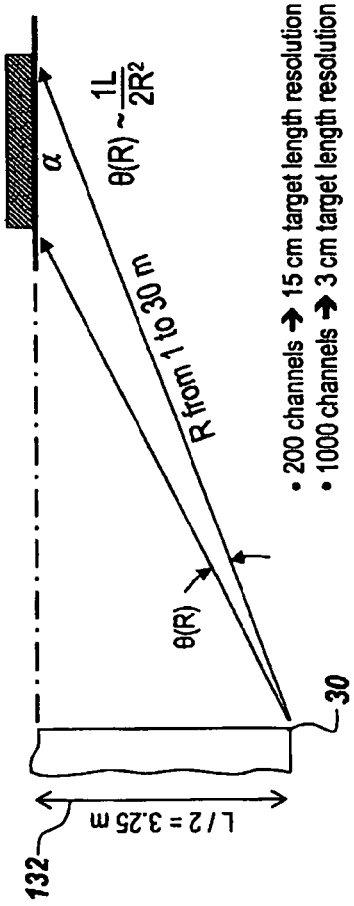

Referring to FIG. 10, how graph 9 is calculated is shown. Here projector 30 is shown projecting a fan beam towards a resolution element 130 of 5l=5 cm. The calculation $\theta(R) \sim 1L/2R^2$, where 1 is the resolution element length and L is the separation between the projectors, yields a color probe beam separation for 200 channels that produces a 15 cm target length resolution. For 1,000 channels one would have a 3 cm resolution.

Note that the distance indicated by double-ended arrow 132 is L/2=3.25 meters.

What will be seen is that one has provided a polyspectral rangefinder based on wavelength division multiplexing technology with a realizable resolution in a few centimeters that uses a lookup table readout of target position and extent without calculation-intensive algorithms that would delay threat detection and position indication.

The subject polyspectral rangefinder is inexpensive when based on commercial communication multiplexing and demultiplexing hardware and importantly provides sufficient resolution to be able to countermeasure an incoming RPG, TOW missile or even a projectile due to the rapid response time achievable.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for rapidly ascertaining where in space an incoming threat is located relative to a protected space, comprising the steps of:
   projecting from two spaced points a multiplicity of narrow angularly displaced differently colored fan beams such that fan beams from the spaced points intersect in a surveilled area adjacent the protected space to provide a mosaic of locations, each location having a unique two-color code; and,
   detecting using a wide field of view detector the location of a threat entering into the surveilled area by ascertaining the colors of the returns from a threat at the intersection of two beams, the identity of the detected colors providing a two color code indicating where in the surveilled area the threat is located.

2. The method of claim 1, wherein the detecting step includes providing a sensor at the protected space to sense returned radiation from the threat and further including the step of countermeasuring the threat based on a line between the sensor and the location in the surveilled area at which the threat is determined to be located.

3. The method of claim 1, wherein the sensor utilizes color filters to separate out different colors of returned light.

4. The method of claim 1, wherein the detecting step includes the step of pre-mapping the surveilled area in terms of color cells at which beams from the two positions cross, each cell having a unique set of colors associated therewith.

5. The method of claim 4, wherein the map of color cells includes color bins, one each corresponding to a color cell.

6. The method of claim 5, wherein the detecting step includes entering the color bins into a lookup table and ascertaining from the lookup table the identity of the color bin and the corresponding location of the associated color cell in the surveilled area.

7. The method of claim 6, and further including deploying a countermeasure based on information in the lookup table.

8. A method for rapidly ascertaining the location of an incoming close-in threat in time to countermeasure the threat, comprising:
   providing a polyspectral rangefinder in which a multiplicity of narrow beams of differently-colored light are projected out at two spaced-apart points with differently colored beams being angularly spaced apart such that differently colored beams intersect to form a number of two-color cells at predetermined intersection point locations, thus to provide a two-color code for each area that the beams intersect;
   detecting threat location by the colors of beams reflected by the threat to the rangefinder using a computationless direct method such that threat location is available as soon as reflected light and the associated color code is detected; and,
   directing a countermeasure to the detected threat location, whereby countermeasuring is available for close-in threats.

9. The method of claim 8, wherein the detecting step includes providing a map of the color cells in a lookup table that correlates color code with location.

10. The method of claim 9, wherein the directing step includes using the lookup table to direct the countermeasure to the threat location.

11. The method of claim 8, wherein the angular orientation of the beams is dependent on distance to a predetermined region in the surveilled area.

12. The method of claim 11, wherein the beams have a non-uniform angular distribution.

13. A system for determining the distance to a target comprising:
   a first projector for directing a first set of narrow beams of light from a first position on a sensor platform comprising a first plurality of colors toward the target;
   a second projector for directing a second set of narrow beams of light from a second position on said sensor platform comprising a second plurality of colors toward the targets so that said second set intersects a beam from said first set in an intersection area, said intersection area being comprised of a plurality of color cells formed by said intersections, with each position of intersecting crossed beams being uniquely identified by a two color code, wherein each of said color cells has a unique two color signature; and,
   a receiver for sensing a reflection of light from the target and ascertaining the position of the target based on the detected color code, said detected color code corresponding to the color cell in which the target is located.

14. The system of claim 13, wherein each of said projectors includes a broadband laser, a multiplexer for outputting light at different wavelengths and optics for focusing the outputted light from said multiplexer into respective beams.

15. The system of claim 14, wherein said mutiplexer includes a main optical filter coupled to said broadband laser and secondary optical filters tapped off said main optical filter at different wavelength-selective gratings such that each of said secondary filters carries a different color.

16. The system of claim 13, wherein said receiver includes a demultiplexer coupled to received reflected light for filtering out different colors of received reflected light.

17. The system of claim 16, wherein said demultiplexer includes a main optical filter and a plurality of secondary optical fibers tapped from said main optical filter at respective wavelength-selective gratings.

18. The system of claim 17, and further including detectors at the ends of said secondary optical fibers for outputting a signal when light of a predetermined wavelength exists in the associated fiber.

19. The system of claim 18, wherein said receiver includes a lookup table having color cell bins associated with predetermined locations in the intersecting beam area, said detectors being coupled to said lookup table such that said lookup table outputs threat location corresponding to the outputs of at least two detectors.

20. The system of claim 13, wherein said beams are non-uniformly distributed.

* * * * *